US011876285B2

(12) United States Patent
Chang et al.

(10) Patent No.: US 11,876,285 B2
(45) Date of Patent: Jan. 16, 2024

(54) ANTENNA APPARATUS AND TERMINAL

(71) Applicant: Huawei Technologies Co., Ltd., Shenzhen (CN)

(72) Inventors: Le Chang, Shenzhen (CN); Kunpeng Wei, Shenzhen (CN)

(73) Assignee: HUAWEI TECHNOLOGIES CO. LTD., Shenzhen (CN)

(*) Notice: Subject to any disclaimer, the term of this patent is extended or adjusted under 35 U.S.C. 154(b) by 374 days.

(21) Appl. No.: 17/418,515

(22) PCT Filed: Dec. 27, 2018

(86) PCT No.: PCT/CN2018/124495
§ 371 (c)(1),
(2) Date: Jun. 25, 2021

(87) PCT Pub. No.: WO2020/133111
PCT Pub. Date: Jul. 2, 2020

(65) Prior Publication Data

US 2022/0123456 A1 Apr. 21, 2022

(51) Int. Cl.

| | |
|---|---|
| ***H01Q 1/24*** | (2006.01) |
| ***H01Q 5/40*** | (2015.01) |
| ***H01Q 13/10*** | (2006.01) |
| ***H01Q 21/24*** | (2006.01) |
| ***H01Q 21/28*** | (2006.01) |
| *H01Q 1/38* | (2006.01) |

(52) U.S. Cl.
CPC ............... *H01Q 1/243* (2013.01); *H01Q 5/40* (2015.01); *H01Q 13/10* (2013.01); *H01Q 21/24* (2013.01); *H01Q 21/28* (2013.01); *H01Q 1/38* (2013.01)

(58) Field of Classification Search
CPC .......... H01Q 1/243; H01Q 13/10; H01Q 1/38; H01Q 21/28; H01Q 5/40; H01Q 21/24; H01Q 9/40
See application file for complete search history.

(56) References Cited

U.S. PATENT DOCUMENTS

2015/0048982 A1* 2/2015 Wang .................. H01Q 13/106 343/751
2015/0303568 A1 10/2015 Yarga et al.
(Continued)

FOREIGN PATENT DOCUMENTS

CN 104103888 A 10/2014
CN 204481122 U 7/2015
(Continued)

OTHER PUBLICATIONS

Ban, Y., et al., "4G/5G Multiple Antennas for Future Multi-Mode Smartphone Applications," Jun. 21, 2016, 8 pages.
(Continued)

*Primary Examiner* — Joseph J Lauture
(74) *Attorney, Agent, or Firm* — Conley Rose, P.C.

(57) ABSTRACT

A terminal comprises a printed circuit board (PCB), a PCB floor, and a rear cover. The metal frame is disposed at edges of the PCB floor. The PCB floor is disposed between the PCB and the rear cover, and the PCB floor is used to ground electronic components. The antenna apparatus may include a split antenna formed by a split provided on the metal frame, and a slot antenna formed by a slot connecting to the split. The slot may be connected to the split at a middle position on one side of the slot, and the slot may be provided on the metal frame of the terminal or on a PCB floor of the terminal.

20 Claims, 16 Drawing Sheets

(56) References Cited

U.S. PATENT DOCUMENTS

| | | | |
|---|---|---|---|
| 2018/0205146 A1 | 7/2018 | Huang | |
| 2018/0234072 A1 | 8/2018 | Kuo et al. | |

FOREIGN PATENT DOCUMENTS

| | | |
|---|---|---|
| CN | 107317103 A | 11/2017 |
| CN | 108417973 A | 8/2018 |
| CN | 108808221 A | 11/2018 |
| CN | 108987901 A | 12/2018 |

OTHER PUBLICATIONS

Wong, K., et al., "16-Antenna Array in the Smartphone for the 3.5-GHz MIMO operation," Asia-Pacific Microwave Conference (APMC), 2015, 3 pages.

Sun, L., et al., "Compact 5G MIMO Mobile Phone Antennas With Tightly Arranged Orthogonal-Mode Pairs," IEEE Transactions on Antennas and Propagation, vol. 66, No. 11, Nov. 30, 2018, XP011694189, 6 pages.

Yan, K., et al., "Eight-Antenna Array in the 5G Smartphone for the Dual-Band MIMO System," IEEE International Symposium on Antennas and Propagation and USNC/URSI National Radio Science Meeting, Jul. 13, 2018, XP033496262, 2 pages.

Ming-Yang, M., et al.:"Eight-Port Orthogonally Dual-Polarized Antenna Array for 5G Smartphone Applications," IEEE Transactions on Antennas and Propagation, vol. 64, No. 9, Sep. 30, 2016, XP011621881, 2 pages.

Li, Y., et al., "Multiband 10-Antenna Array for Sub-6 GHz MIMO Applications in 5-G Smartphones," May 18, 2018, 13 pages.

Li, M., et al, "Tri-Polarized 12-Antenna MIMO Array for Future 5G Smartphone Applications," Dec. 11, 2017, 11 pages.

Wong, K., et al, "Two Asymmetrically Mirrored Gap-Coupled Loop Antennas as a Compact Building Block for Eight-Antenna MIMO Array in the Future Smartphone," IEEE Transactions on Antennas and Propagation, vol. 65, No. 4, Apr. 2017, 14 pages.

* cited by examiner

ANTENNA APPARATUS AND TERMINAL

CROSS-REFERENCE TO RELATED APPLICATIONS

This is a U.S. National Stage of International Patent Application No. PCT/CN2018/124495 filed on Dec. 27, 2018, which is hereby incorporated by reference in its entirety.

TECHNICAL FIELD

The present invention relates to the field of antenna technologies, and in particular, to an antenna apparatus applied to a terminal.

BACKGROUND

Development of mobile communications technologies promotes application of a multi-input multi-output (multi input multi output, MIMO) antenna technology, such as a wireless fidelity multi-input multi-output (wireless fidelity MIMO, Wi-Fi MIMO) antenna, on terminals. Antennas multiply in quantity, covering increasingly more frequency bands. However, a recent terminal design tends to have a higher screen-to-body ratio, more multimedia devices, and a larger battery capacity, resulting in sharp compression of antenna space. How to deploy multiple antennas in limited design space is a challenging question. In addition, an industrial design (industry design, ID), such as a metal ID or a bezel-less screen ID, of a terminal product needs to be considered during antenna layout, further increasing difficulty of the antenna layout.

Existing MIMO antenna technologies are classified into two types: a stacked antenna and a compact dual-antenna pair.

The stacked antenna is placing together some basic types of antenna units, such as a monopole, a dipole, and a slot, with a combination of some decoupling technologies like neutralization wires and choke slots, to form multiple antennas. This MIMO antenna has a complex design, occupies a large clearance, and is difficult to expand and include more antenna units.

The compact dual-antenna pair is placing two antenna units within a small-scale range, and isolation between the dual-antenna pair is improved by using self-decoupling or orthogonal polarization. This is a modular design solution and easy to expand and include more antenna units. This MIMO antenna array is simple in design, but inapplicable to a terminal with a metal ID because currently only a non-metal ID solution is available.

SUMMARY

Embodiments of the present invention provide an antenna apparatus with a simple structure, to implement a multi-antenna structure on a terminal with a metal frame or an all-metal ID.

According to a first aspect, this application provides an antenna apparatus applied to a terminal. The terminal may include a metal frame, a printed circuit board PCB, a PCB floor, and a rear cover. The metal frame may be disposed at edges of the PCB floor, the PCB floor may be disposed between the PCB and the rear cover, and the PCB floor may be used to ground an electronic component carried on the PCB. The antenna apparatus may include: a split antenna formed by a split provided on the metal frame, and a slot antenna formed by a slot connecting to the split. The slot may be connected to the split on one side of the slot, and another side of the slot may touch the PCB floor. Specifically, the slot may be connected to the split at a middle position on one side of the slot.

A first feeding network may be connected to two sides of the split. The first feeding network may be used to excite the antenna apparatus to generate a first radiation mode. A primary radiator of the first radiation mode is the slot. A half wavelength in-phase electric field is distributed over the slot. A second feeding network may be further connected to one side of the split. The second feeding network may be used to excite the antenna apparatus to generate a second radiation mode. A primary radiator of the second radiation mode is the PCB floor. An in-phase current loop is distributed around the slot. A polarization direction of the first radiation mode is orthogonal to a polarization direction of the second radiation mode.

In other words, the antenna apparatus may have two radiation modes: the first radiation mode and the second radiation mode. The first radiation mode may be a half-wavelength slot mode to be mentioned in the embodiments, and the second radiation mode may be an open slot mode (also referred to as an in-phase current loop mode) to be mentioned in the embodiments.

In the first radiation mode, the half wavelength in-phase electric field is distributed over the slot. In this case, the slot may be used as a primary radiator, and a polarization direction is a negative X direction of a horizontal direction of the slot (for an antenna structure shown in FIG. 2A and FIG. 2B) ora Z direction of the slot (for an antenna structure shown in FIG. 3A and FIG. 3B). In other words, the first radiation mode may generate radiation by using the slot.

In the second radiation mode, the split divides the slot into two slots on two sides of the split. Both the slots can operate in a ¼ wavelength mode. From one end of the slot to the other end, distribution of an electric field is as follows: The electric field is changed from zero to a maximum value, a direction of the electric field is reversed after passing through the split, and then the electric field changes from a reverse maximum value to zero. The current forms an in-phase current loop around the slot, to effectively excite the PCB floor to generate radiation. In other words, the second radiation mode may excite the PCB floor to generate radiation by using the split. In this case, the PCB floor may be a primary radiator, and a polarization direction is a negative Y direction.

It can be learned that the polarization directions of the primary radiators in the two radiation modes are orthogonal, to be specific, the polarization direction of the slot and the polarization direction of the PCB floor are orthogonal, to achieve high isolation. In addition, the antenna apparatus can provide multi-antenna in the split, with simple structure and modular design, it is easy to expand. Especially when the slot is provided on the metal frame, the antenna apparatus may be implemented as a zero-clearance co-frequency dual-antenna pair or a zero-clearance multi-antenna of another specification applicable to a terminal with an all-metal ID.

With reference to the first aspect, in some embodiments, the rear cover may be a rear cover made of an insulating material, for example, a glass rear cover or a plastic rear cover. Alternatively, the rear cover may be a metal rear cover. If the terminal is a terminal with an all-metal ID, the rear cover is a metal rear cover.

With reference to the first aspect, in some embodiments, the slot may be a slot provided on the PCB floor, or may be a slot provided on the metal frame. An opening direction of the slot may be consistent with an extension direction of the metal frame.

With reference to the first aspect, in some embodiments, the first feeding network may be specifically implemented as follows:

The first feeding network may include feeding points that are separately disposed on two sides of the split on the metal frame: a first feeding point and a second feeding point. The first feeding point is disposed on one side of the split, and the second feeding point is disposed on the other side of the split. The first feeding network may further include a first feeding line and a first feeding port (port 1). The first feeding line may be a microstrip or another wire. Alternatively, the first feeding line may cross the split and may be used to connect the first feeding port and the feeding points on two sides of the split. Alternatively, the first feeding line may cross the split. This can excite the slot to generate the half wavelength in-phase electric field distributed over the slot.

The first feeding line may use a symmetric feeding line structure, so that electric potentials of the first feeding point and the second feeding point can be equal, and the two sides of the split are equipotential.

A matching network may be designed at the first feeding port (port 1), and the matching network may be used to adjust (by adjusting an antenna transmit coefficient, impedance, or the like) a frequency band range covered by the slot.

With reference to the first aspect, in some embodiments, the second feeding network may be specifically implemented as follows:

The second feeding network may include a third feeding point disposed on one side of the split on the metal frame, a second feeding line, and a second feeding port (port 2). The second feeding line may be a microstrip or another wire. The second feeding line may be used to connect the second feeding port and the third feeding point. The second feeding line may cross the split, to excite the split to generate an electric field distributed over the split, finally form the in-phase current loop around the slot, and effectively excite the PCB floor. In this case, the PCB floor may be used as a primary radiator of the antenna structure to generate radiation.

A matching network may be designed at the second feeding port (port 2), and the matching network may be used to adjust (by adjusting an antenna transmiit coefficient, impedance, or the like) a frequency band range covered by the PCB floor.

With reference to the first aspect, in some embodiments, a resonance generated when the antenna apparatus operates in the half-wavelength mode and excites the slot antenna and a resonance generated when the antenna apparatus operates in the in-phase current loop mode and excites the PCB floor may be in a same frequency band. In other words, the antenna apparatus may be a co-frequency dual-antenna pair.

Optionally; the antenna apparatus may be specifically a Sub-6G dual-antenna pair whose operating frequency ranges from 3.4 GHz to 3.6 GHz, or the same frequency band is a Sub-6G frequency hand. Optionally, the antenna apparatus may be specifically a co-frequency dual Wi-Fi antenna pair, for example, a dual Wi-Fi antenna pair for a 2.4 GHz frequency band, or the same frequency band is a Wi-Fi frequency band, for example, a 2.4 GHz Wi-Fi frequency band. This is not limited thereto. The antenna apparatus may be alternatively a co-frequency dual-antenna pair for another frequency band.

With reference to the first aspect, in some embodiments, when operating in the half-wavelength mode, the antenna apparatus may excite the slot to generate a resonance for a first frequency band, and when operating in the in-phase current loop mode, the antenna apparatus may excite the PCB floor to generate a resonance for a second frequency band.

Optionally, the first frequency band may include a Wi-Fi frequency band, and the second frequency band may include a Wi-Fi frequency band and a GPS frequency band. For example, the antenna apparatus may excite the slot to generate a 2.4 GHz Wi-Fi resonance in the half-wavelength mode (the first frequency band is a 2.4 GHz Wi-Fi frequency band), and excite the PCB floor to generate a GPS L1 resonance and a 2.4 GHz Wi-Fi resonance in the in-phase current loop mode (the second frequency band includes a 2.4 GHz Wi-Fi frequency band and a GPS L1 frequency band). This is not limited thereto. The first frequency band and the second frequency band may be alternatively other frequency bands. For example, the antenna structure may excite the slot to generate a 2.4 GHz Wi-Fi resonance in the half-wavelength mode (the first frequency hand is a 2.4 GHz Wi-Fi frequency band), and excite the PCB floor to generate a GPS L5 resonance and a 2.4 GHz Wi-Fi resonance in the in-phase current loop mode (the second frequency band includes a 2.4 GHz Wi-Fi frequency band and a GPS L5 frequency band).

According to a second aspect, this application provides a terminal. The terminal may include a metal frame, a printed circuit board PCB, a PCB floor, a rear cover, and the antenna apparatus described in the first aspect.

BRIEF DESCRIPTION OF DRAWINGS

To describe the technical solutions in the embodiments of this application more clearly, the following illustrates the accompanying drawings in the embodiments of this application.

DESCRIPTION OF EMBODIMENTS

The following describes the embodiments of the present invention with reference to the accompanying drawings in the embodiments of the present invention.

Technical solutions according to this application are applicable to a terminal that uses one or more of the following MIMO communications technologies: a long term evolution (long term evolution, LTE) communications technology, a Wi-Fi communications technology, a 5G communications technology, a Sub-6G communications technology, and other future MIMO communications technologies. In this application, the terminal may be an electronic device such as a mobile phone, a tablet, or a personal digital assistant (personal digital assistant, PDA).

Figure 1:
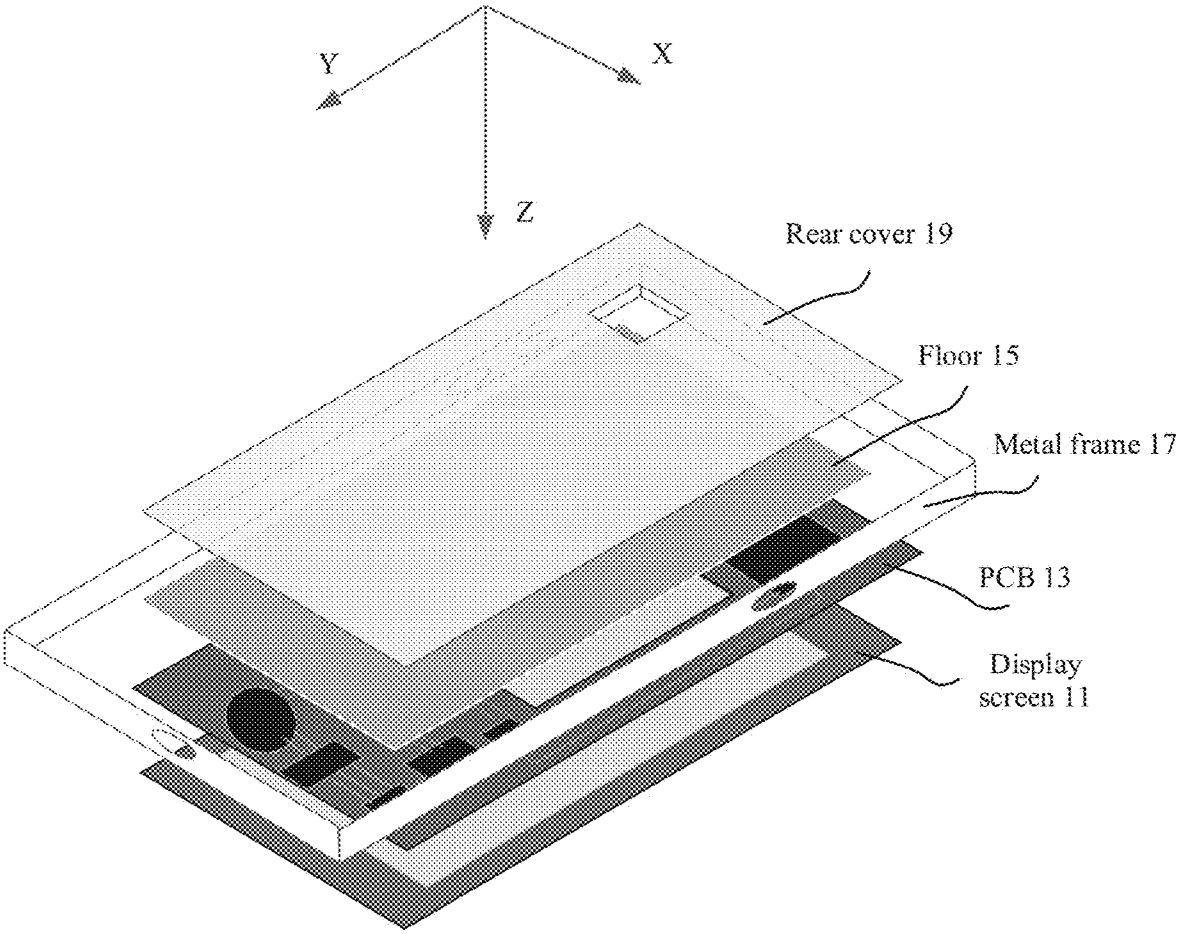
FIG. 1 is a schematic structural diagram of a terminal according to an embodiment of this application.

FIG. 1 shows an example of an internal environment of a terminal on which an antenna design solution according to this application is based. As shown in FIG. 1, the terminal may include a display screen 11, a printed circuit board PCB 13, a PCB floor 15, a metal frame 17, and a rear cover 19. The display screen 11, the printed circuit board PCB 13, the PCB floor 15, and the rear cover 19 may be disposed at different layers. The layers may be parallel to each other. A plane on which each layer is located may be referred to as an X-Y plane, and a direction perpendicular to the X-Y plane is a Z direction. In other words, the display screen 11, the printed circuit board PCB 13, the PCB floor 15, and the rear cover 17 may be distributed in a layered manner in the Z direction.

The printed circuit board PCB 13 may be an FR-4 dielectric board, or may be a Rogers (Rogers) dielectric board, or may be a Rogers and FR-4 hybrid dielectric board, or the like. Herein, FR-4 is a grade designation for a flame-resistant material, and the Rogers dielectric board is a high frequency board.

The rear cover 19 may be a rear cover made of an insulating material, for example, a glass rear cover or a plastic rear cover. Alternatively, the rear cover 19 may be a metal rear cover. If the terminal shown in FIG. 1 is a terminal with an all-metal ID, the rear cover 19 is a metal rear cover.

The PCB floor 15 is grounded, and may be disposed between the printed circuit board PCB 13 and the rear cover 19. The PCB floor 15 may also be referred to as a PCB baseboard. Specifically, the PCB floor 15 may be a layer of metal etched on the surface of the PCB 13. This layer of metal may be connected to a metal middle frame (not shown) by using a series of metal springs, and is integrated with the metal middle frame. The PCB floor 15 may be used to ground an electronic component carried on the printed circuit board PCB 13. Specifically, the electronic component carried on the printed circuit board PCB 13 may be grounded by connecting to the PCB floor 15, to prevent an electric shock of a user or a device damage.

The metal frame 17 may be disposed at edges of the printed circuit board PCB 13 and the PCB floor 15, and may cover, from a side, the printed circuit board PCB 13 and the PCB floor 15 that are between the rear cover 19 and the display screen 11, to achieve dust-proof and waterproof purposes. In an implementation, the metal frame 17 may include four metal edges, and the four metal edges may be looped around the display screen 11, the printed circuit board PCB 13, the PCB floor 15, and the rear cover 19. In another implementation, the metal frame 17 may include only two metal edges, and the two metal edges may be disposed on two sides of the display screen 11, the printed circuit board PCB 13, the PCB floor 15, and the rear cover 19 in the Y direction. This is not limited to the two implementations. Alternatively, the metal frame 17 may present another design style, for example, a metal frame 17 with a single metal edge. This is not limited in this application.

Based on the internal environment of the terminal shown in FIG. 1, this application provides a multi-antenna design solution applicable to a terminal with a metal frame and a multi-antenna design solution applicable to a terminal with an all-metal ID.

A main design idea of the multi-antenna design solution according to this application may include: opening a split on the metal frame 17, and forming a multi-antenna structure by using a split antenna formed by the split and a slot antenna formed by a slot communicating with the split. The slot may be connected to the split at a middle position on one side of the slot, and another side of the split may touch the PCB floor.

Figure 2A:
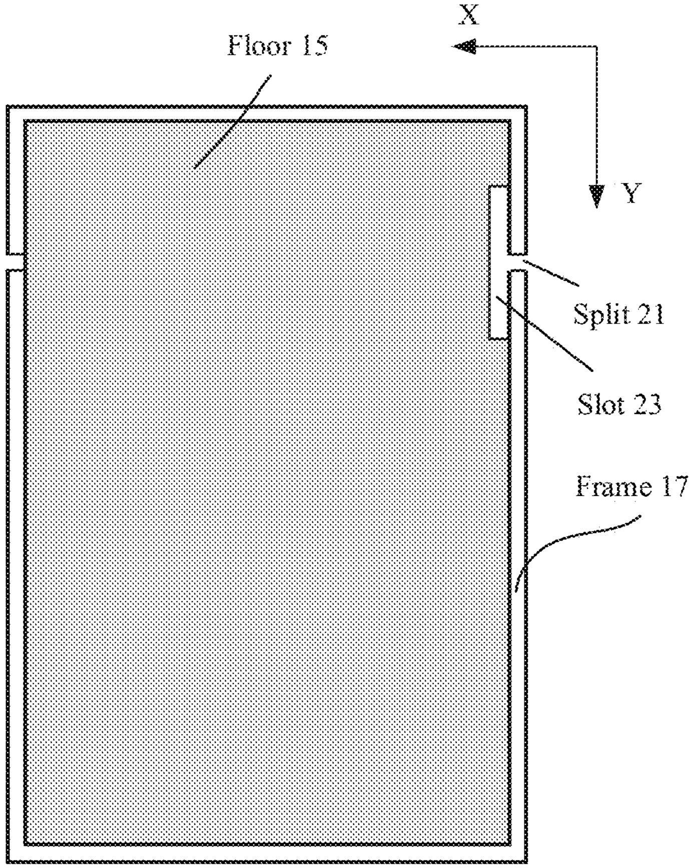
FIG. 2A and FIG. 2B are schematic diagrams of an antenna apparatus according to this application.
Figure 2B:
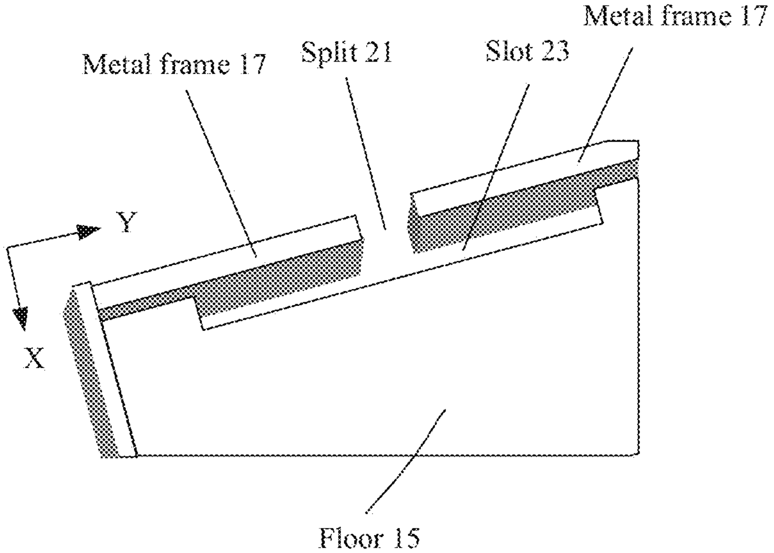

In some embodiments, the slot may be provided on the PCB floor 15, as shown in FIG. 2A and FIG. 2B. FIG. 2A is a view for observing the antenna structure in the Z direction, and FIG. 2B is a view for observing the antenna structure in the negative X direction. As shown in FIG. 2A and FIG. 2B, the slot may be a slot 23 provided on the PCB floor 15. An opening direction of the slot 23 may be consistent with an extension direction of the metal frame 17. The slot 23 may be connected to a split 21 provided on the metal frame 17 at a middle position on one side of the slot 23.

Figure 3A:
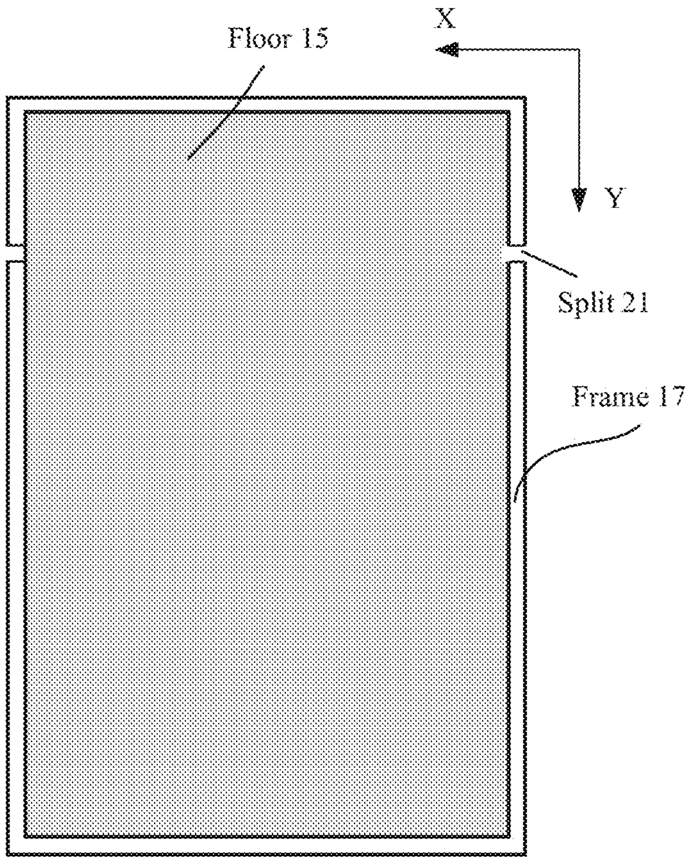
FIG. 3A and FIG. 3B are schematic diagrams of an antenna apparatus according to this application.
Figure 3B:
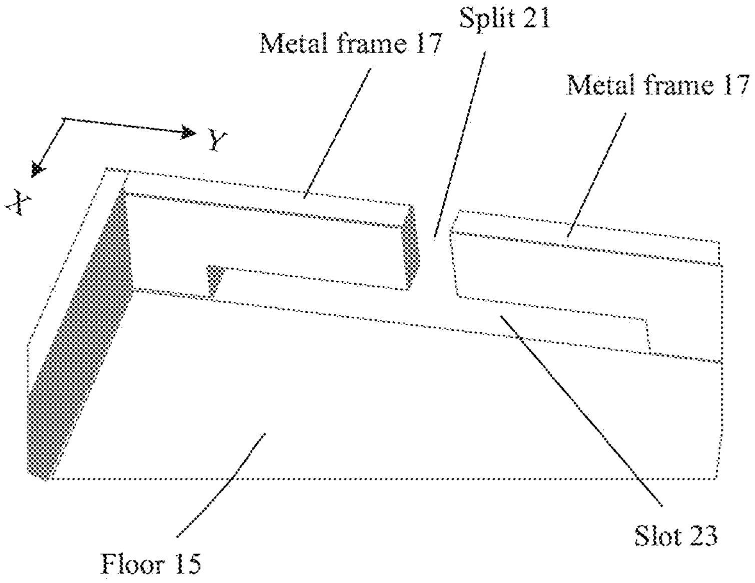

In other embodiments, the slot may be provided on the metal frame 17, as shown in FIG. 3A and FIG. 3B. FIG. 3A is a view for observing the antenna structure in the Z direction, and FIG. 3B is a view for observing the antenna structure in the negative X direction. As shown in FIG. 3A and FIG. 3B, the slot may be a slot 23 provided on the metal frame 17. An opening direction of the slot 23 is consistent with an extension direction of the metal frame 17. The slot 23 may be connected to a split 21 provided on the metal frame 17 at a middle position on one side of the slot 23. Another side of the slot 23 may touch the PCB floor 15.

Figure 4A:
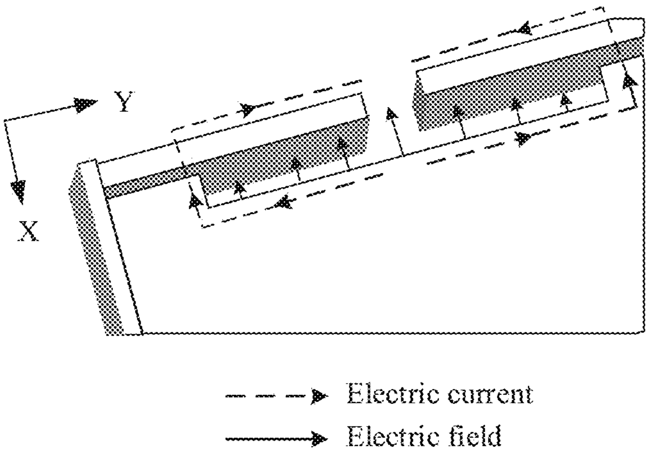
FIG. 4A and FIG. 4B are schematic diagrams of two radiation modes of the antenna structure shown in FIG. 2A and FIG. 2B.
Figure 4B:
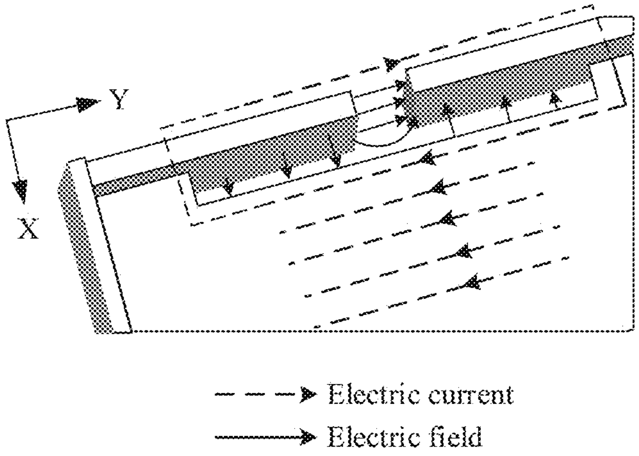
Figure 5A:
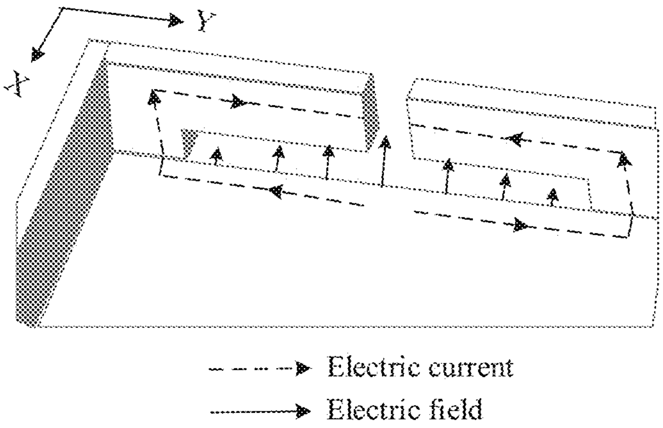
FIG. 5A and FIG. SB are schematic diagrams of two radiation modes of the antenna structure shown in FIG. 3A and FIG. 3B.
Figure 5B:
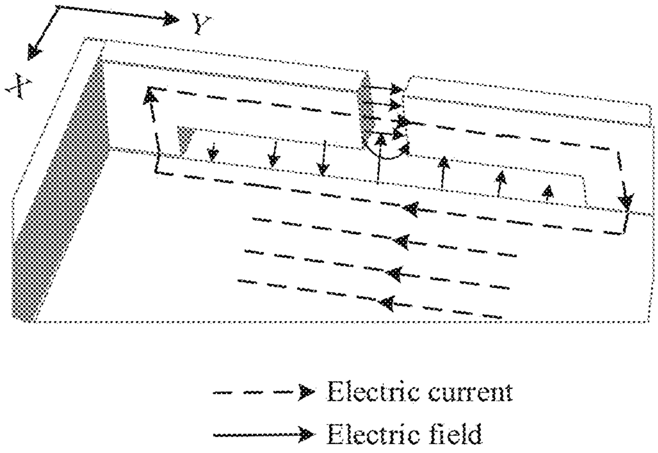

Two radiation modes of the antenna structure according to this application may be shown in FIG. 4A, FIG. 4B, FIG. 5A, and FIG. 5B. FIG. 4A and FIG. 4B show radiation modes of the antenna structure shown in FIG. 2A and FIG. 2B. FIG. 5A and FIG. 5B show radiation modes of the antenna structure shown in FIG. 3A and FIG. 3B.

The antenna structure according to this application may have two radiation modes: a half-wavelength slot mode (shown in FIG. 4A and FIG. 5A) and an open slot mode (also referred to as an in-phase current loop mode) (shown in FIG. 4B and FIG. 5B). In this application, the half-wavelength mode may be referred to as a first radiation mode, and the open slot mode (also referred to as an in-phase current loop mode) may be referred to as a second radiation mode.

In the half-wavelength slot mode, a half wavelength in-phase electric field is distributed over the slot 21 Two sides of the split 21 may be equipotential. The split 21 does not affect a resonance generated by the slot 23 as a slot antenna (whose two ends are closed), and the slot antenna whose two ends are closed usually generates a resonance in the half-wavelength mode. As shown in FIG. 4A and FIG. 5A, current distribution over the slot 23 may be typical current distribution of the slot antenna in the half-wavelength mode. In this case, the slot 23 may be used as a primary radiator, and a polarization direction is a negative X direction of a horizontal direction of the slot 23 (for the antenna structure shown in FIG. 2A and FIG. 2B) or a Z direction of the slot 23 (for the antenna structure shown in FIG. 3A and FIG. 3B).

That is to say, the half-wavelength slot mode may excite the slot 23 to generate a half wavelength in-phase electric field distributed over the slot 23 (distributed over the slot 23). In this case, the slot 23 may be used as a primary radiator of the antenna structure to generate radiation. To be specific, the half-wavelength slot mode can generate radiation by using the slot.

In the open slot mode (or referred to as an in-phase current loop mode), the split 21 divides the slot 23 into two slots on two sides of the split 21. Both the slots can operate in a ¼ wavelength mode. From one end of the slat 23 to the other end, distribution of an electric field is as follows: The electric field is changed from zero to a maximum value, a direction of the electric field is reversed after passing through the split 21, and then the electric field changes from a reverse maximum value to zero. As shown in FIG. 4B and FIG. 5B, the current forms an in-phase current loop around the slot 23, to effectively excite the PCB floor to generate radiation. In other words, the in-phase current loop mode may excite the PCB floor to generate radiation by using the split. In this case, the PCB floor 15 may be a primary radiator, and a polarization direction is a negative Y direction.

That is to say, the open slot mode (or referred to as an in-phase current loop mode) may excite the split 21 to generate an in-phase current loop around the slot 23, thereby effectively exciting the PCB floor 15 to generate radiation. In this case, the PCB floor 15 may be used as a primary radiator of the antenna structure to generate radiation.

It can be learned that polarization directions of the two radiation modes are orthogonal, to be specific, the polarization direction of the primary radiator slot 23 in the first radiation mode and the polarization direction of the primary radiator PCB floor 15 in the second radiation mode are orthogonal, to achieve high isolation. In specific implementation, the antenna structure (as shown in FIG. 2A and FIG. 2B or in FIG. 3A and FIG. 3B) according to this application can operate in the two radiation modes by using a proper feeding network. In this way, a dual-antenna pair can be obtained in the split 21, and a 2×2 MIMO specification can be implemented. Further, some matching circuits (such as tuning switches) or switch circuits are combined to adjust the length of the slot 23, so that more frequency bands can be covered. In addition, the antenna design solution is a modular design, and can be easy to expand and include more antenna units.

In addition, the antenna design solution according to this application is applicable to a terminal with a metal frame. The slot 23 in the antenna structure shown in FIG. 3A and FIG. 3B is provided on the metal frame 17. In this case, the antenna structure may radiate a signal outward by using the slot 23 and no clearance needs to be reserved on the PCB 13. The antenna structure is applicable to a terminal with an all-metal ID.

The following describes in detail antenna structures according to the embodiments of this application.

Embodiment 1

Figure 6A:
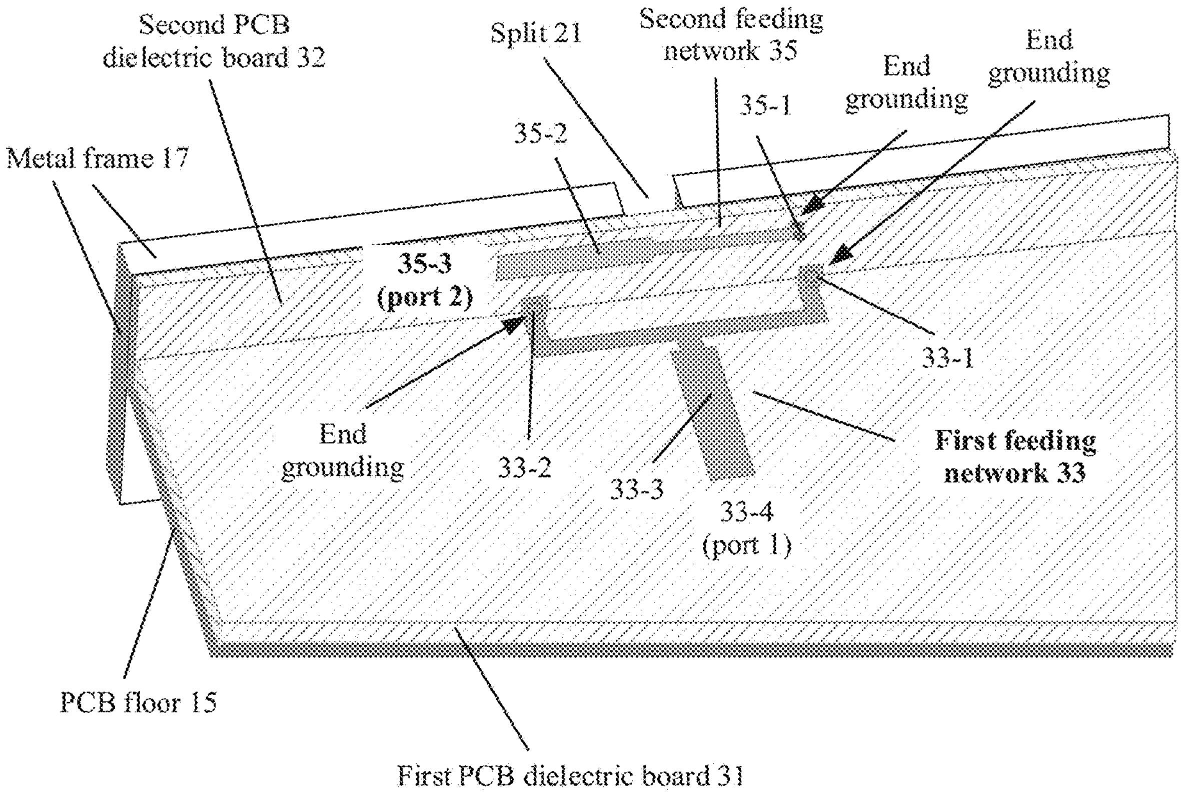
FIG. 6A and FIG. 6B are schematic diagrams of an antenna design solution according to an embodiment of this application.
Figure 6B:
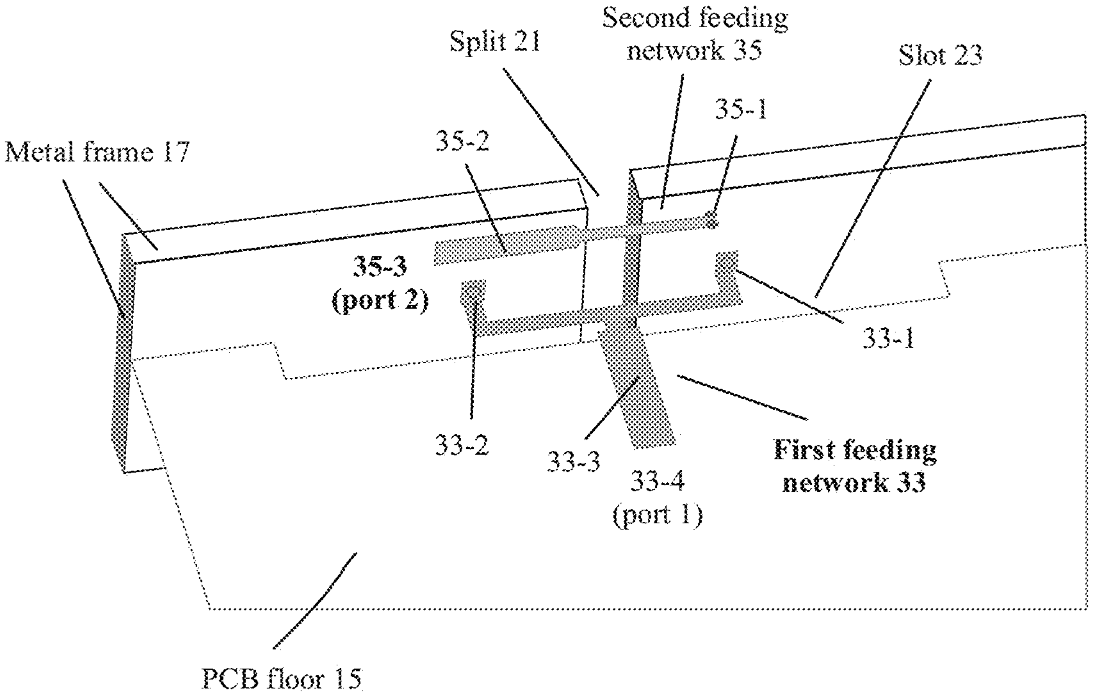

FIG. 6A and FIG. 6B show an example of an antenna structure according to Embodiment 1. FIG. 6A is a schematic diagram of an antenna model including a PCB dielectric board, and FIG. 6B is a schematic diagram of an antenna structure after the PCB dielectric board is hidden. A PCB floor 15 may be disposed at the bottom of a first PCB dielectric board 31 (the PCB 13 in FIG. 1). Alternatively, a second PCB dielectric board 32 may be disposed close to a metal frame 13. As shown in FIG. 6A and FIG. 6B, the antenna structure may include a split 21 provided on the metal frame 17 and a slot 23 provided on the PCB floor 15. The slot 23 may be connected to the split 21 at a middle position on one side of the slot 23.

A first feeding network 33 may be connected to two sides of the split 21. The first feeding network 33 may be specifically printed on the first PCB dielectric board 31 and the second PCB dielectric board 32. The first feeding network 33 may be used to excite the antenna structure to operate in the half-wavelength slot mode, to be specific, excite the antenna structure to generate a half wavelength in-phase electric field distributed over the slot 23. In this case, the slot 23 is used as a primary radiator to generate radiation.

Specifically, the first feeding network 33 may include feeding points that are disposed on two sides of the split 21 on the metal frame 17: a first feeding point 33-i and a second feeding point 33-2. The first feeding point 33-1 is disposed on one side of the split 21, and the second feeding point 33-2 is disposed on the other side of the split 21. The first feeding network 33 may further include a first feeding line 33-3 and a first feeding port 33-4 (port 1). The first feeding line 33-3 may be a microstrip or another wire. The first feeding line 33-3 may be used to connect the first feeding port 33-4 and the feeding points on the two sides of the split 21. Specifically, an end of the first feeding line 33-3 may pass through the second PCB dielectric board 32 (in a manner of drilling a hole) and be connected to the feeding points on the two sides of the split 21. The first feeding line 33-3 may use a symmetric feeding line structure, for example, a T-shaped feeding line structure shown in FIG. 6A and FIG. 6B. In this way, electric potentials of the first feeding point 33-1 and the second feeding point 33-2 can be equal, so that the two sides of the split 21 are equipotential. Therefore, the split 21 may not affect a resonance generated by the slot 23 as a slot antenna (whose two ends are closed). Alternatively, the first feeding line 33-3 may cross the slot 23, to excite the slot 23 to generate a half wavelength in-phase electric field distributed over the slot 23. In this case, the slot 23 may be used as a primary radiator of the antenna structure to generate radiation. A matching network may be designed at the first feeding port 33-4 (port 1), and the matching network may be used to adjust (by adjusting an antenna transmit coefficient, impedance, or the like) a frequency band range covered by the slot antenna formed by the slot 23.

A second feeding network 35 may be connected to one side of the split 21. The second feeding network 35 may be specifically printed on the second PCB dielectric board 32. The second feeding network 35 may be used to excite the antenna structure to operate in the open slot mode (or referred to as an in-phase current loop mode), to be specific, to excite the antenna structure to generate an in-phase current loop around the slot 23.

Specifically, the second feeding network 35 may include a third feeding point 35-1 disposed on one side of the split 21 on the metal frame, a second feeding line 35-2, and a second feeding port 35-3 (port 2). The second feeding line 35-2 may be a microstrip or another wire. The second feeding line 35-2 may be used to connect the second feeding port 35-3 and the third feeding point 35-1. Specifically, an end of the second feeding line 35-2 may pass through the second PCB dielectric board 32 (in a manner of drilling a hole) and be connected to the third feeding point 35-1. The second feeding line 35-2 may cross the split 21, to excite the split 21 to generate an electric field distributed over the split 21, finally form an in-phase current loop around the slot 23, and effectively excite the PCB floor 15. In this case, the PCB floor 15 may be used as a primary radiator of the antenna structure to generate radiation. A matching network may be designed at the second feeding port 35-3 (port 2), and the matching network may be used to adjust (by adjusting an antenna transmit coefficient, impedance, or the like) a frequency band range covered by the PCB floor 15.

It can be learned from the foregoing content that a polarization direction of the antenna structure when the antenna structure operates in the half-wavelength slot mode is orthogonal to a polarization direction when the antenna structure operates in the open slot mode (or referred to as an in-phase current loop mode), thereby having good isolation.

The antenna structure according to Embodiment 1 may be a Sub-6G dual-antenna pair whose operating frequency ranges from 3.4 GHz to 3.6 GHz. In an optional implementation, an overall size of the terminal may be 150 mm×75 mm×7 mm, the first PCB dielectric board 31 may be an FR-4 dielectric board with a thickness of 0.8 mm, a size of the slot 23 may be 25 mm×1.5 mm, a size of the split 21 may be 7 mm×1.5 mm, and the second PCB dielectric board 32 close to the metal frame 17 may be an FR-4 dielectric board with a thickness of 0.254 mm.

Figure 7A:
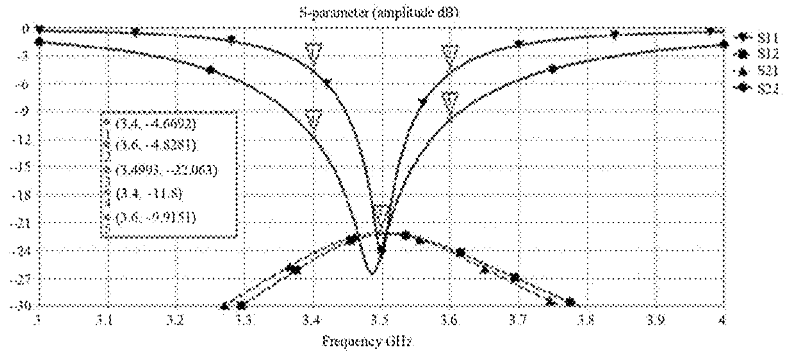
FIG. 7A to FIG. 7C show some schematic simulation diagrams of the antenna design solution shown in FIG. 6A and FIG. 6B.
Figure 7B:
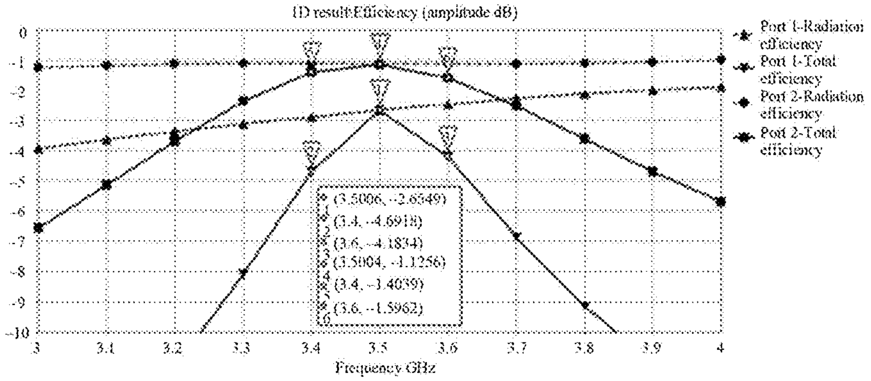
Figure 7C:
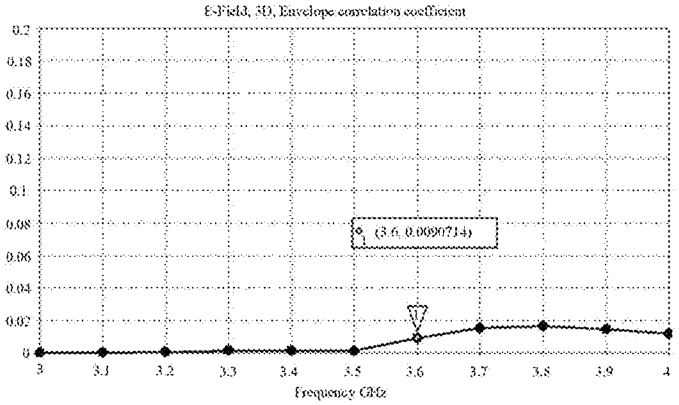
Figure 8A:
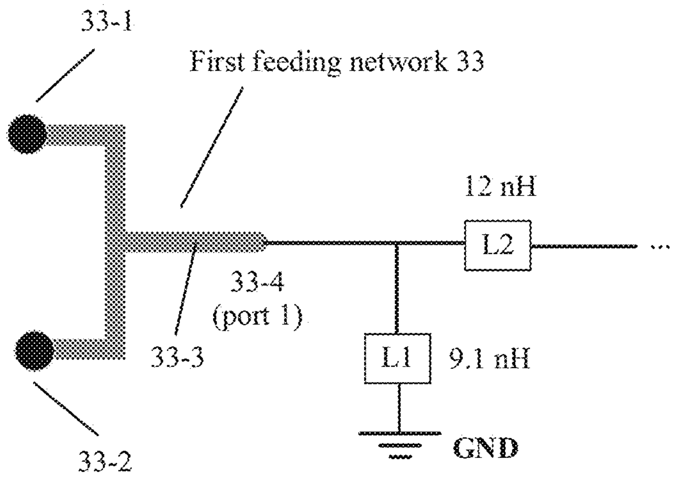
FIG. 8A and FIG. 8B are schematic diagrams of a matching network at a feeding port in the antenna design solution shown in FIG. 6A and FIG. 6B.
Figure 8B:
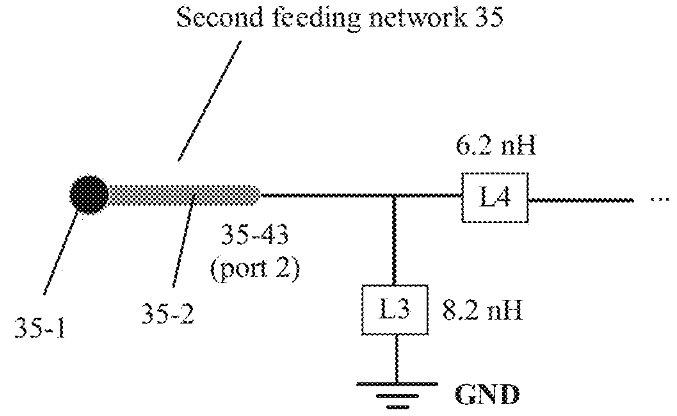

FIG. 7A to FIG. 7C show a simulated S-parameter, an efficiency curve, and an envelope correlation coefficient of the Sub-6G dual-antenna pair according to Embodiment 1. Herein, FIG. 7A represents the simulated S-parameter, FIG. 7B represents the efficiency curve, and FIG. 7C represents the envelope correlation coefficient. In an optional implementation, the matching network designed at the first feeding port 33-4 (port 1) may be first, at the port 1, connected in parallel to a 12 nH inductor (L1) and then connected in series to a 9.1 nH inductor (L2), as shown in FIG. 8A. In an optional implementation, the matching network designed at the second feeding port 35-3 (port 2) may be first, at the port 2, connected in parallel to an 8.2 nH inductor (L3) and then connected in series to a 6.2 nH inductor (L4), as shown in FIG. 8B. All the inductors mentioned herein may be lumped inductors, and may be ideal devices.

As shown in FIG. 7A, in a required operating frequency range of 3.4 GHz to 3.6 GHz, for the half-wavelength slot mode excited by the first feeding port 33-4 (port 1), a reflection coefficient is less than −4.7 dB. For the in-phase current loop mode excited by the second feeding port 35-3 (port 2), a reflection coefficient is less than −9.9 dB. It can be learned that the antenna apparatus can cover the frequency range of 3.4 GHz to 3.6 GHz in the two modes. As shown in FIG. 7B, for the half-wavelength slot mode excited by the first feeding port 33-4 (port 1), a total efficiency is between −4.7 and −2.7. For the in-phase current loop mode excited by the second feeding port 35-3 (port 2), a total efficiency is between −1.6 and −1.1. It can be learned that the radiation efficiencies of the antenna apparatus in the two modes are relatively high, and there is no obvious efficiency dent. Because the polarization directions of the antenna in the two modes are orthogonal, high isolation and a small envelope correlation coefficient are obtained. As shown in FIG. 7C, in a required operating frequency range of 3.4 GHz to 3.6 GHz, an envelope correlation coefficient is less than 0.009, and isolation is better than −22.1 dB. A symmetric structure used by the first feeding network 33 is highly conducive to improvement in isolation. Because the first feeding network 33 has a symmetric structure, when the first feeding port 33-4 (port 1) feeds to excite the half-wavelength slot mode, electric field phases on two sides of the split 21 are the same, but when the second feeding port 35-3 (port 2) feeds to excite the in-phase current loop mode, an electric field phase difference between two sides of the split 21 reaches 180°. In this way, energy cannot be transferred between the first feeding port 33-4 (port 1) and the second feeding port 35-3 (port 2), providing a prerequisite for achieving high isolation.

The antenna structure according to Embodiment 1 can implement a dual-antenna pair for the Sub-6G frequency band. The antenna structure is compact and has high isolation. The antenna structure shown in FIG. 6A and FIG. 6B for example may be alternatively implemented as a co-frequency high-isolation dual-antenna pair for a frequency band other than the Sub-6G frequency band, and may be specifically set by adjusting sizes of the split 21 and the slot 23 in the antenna structure. For example, the antenna structure may be alternatively implemented as a co-frequency dual Wi-Fi antenna pair for a frequency band of 2.4 GHz. The antenna structure is applicable to a terminal with a metal frame. Optionally, the antenna structure may also be applicable to a terminal with an all-metal ID, provided that a clearance is reserved for the antenna structure on the first PCB dielectric board 31.

Embodiment 2

For an antenna structure according to Example 2, refer to FIG. 6A and FIG. 6B. The antenna structure according to Embodiment 2 may be implemented as an antenna of a GPS L1+2.4 GHz Wi-Fi IMMO specification. An operating frequency of the GPS L1 is 1.575 GHz, and an operating frequency of the 2.4 GHz MIMO ranges from 2.4 GHz to 2.5 GHz. In Embodiment 2, an overall size of a terminal, a size of a first PCB dielectric board 31, a size of a second PCB dielectric board 32, and a size of a split 21 are all the same as corresponding designs in Embodiment 1. Embodiment 2 is different from Embodiment 1 in that the size of the slot 23 in Embodiment 2 may be 60 mm×2 mm, in other words, the slot 23 in Embodiment 2 is longer and wider than the slot 23 in Embodiment 1. In addition, a structure and a form of a feeding network (a first feeding network 33 and a second feeding network 35) in Embodiment 2 may be the same as those in Embodiment 1, but because the size of the slot 23 changes, a size of each branch of the feeding network in Embodiment 2 changes, for example, a feeding branch across the slot 23 is longer.

Figure 9A:
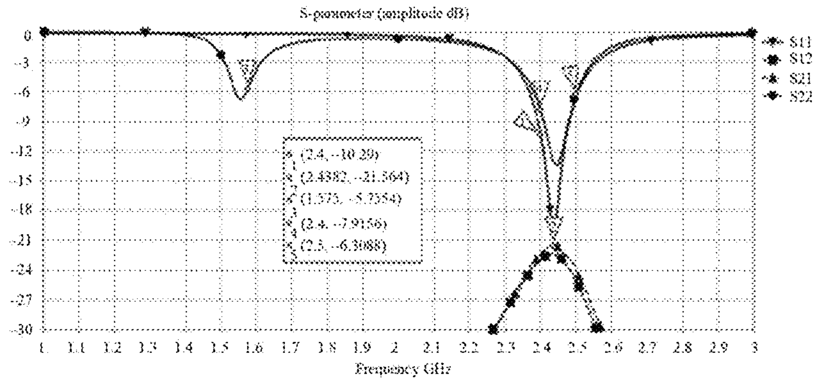
FIG. 9A to FIG. 9C show some schematic simulation diagrams of an antenna design solution according to another embodiment of this application.
Figure 9B:
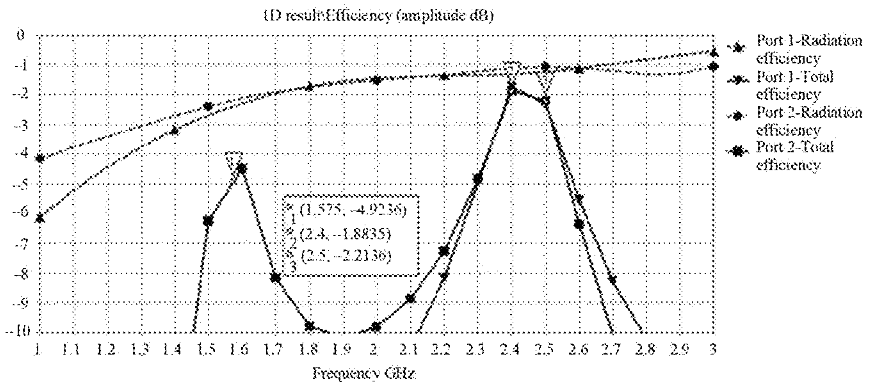
Figure 9C:
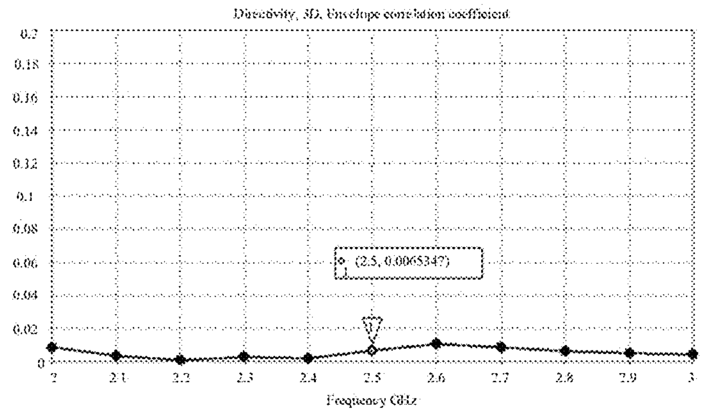
Figure 10A:
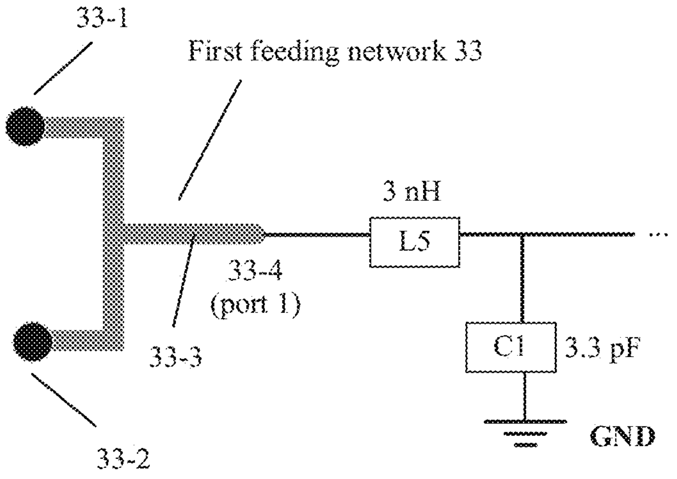
FIG. 10A and FIG. 10B are schematic diagrams of a matching network at a feeding port in an antenna design solution according to another embodiment of this application.
Figure 10B:
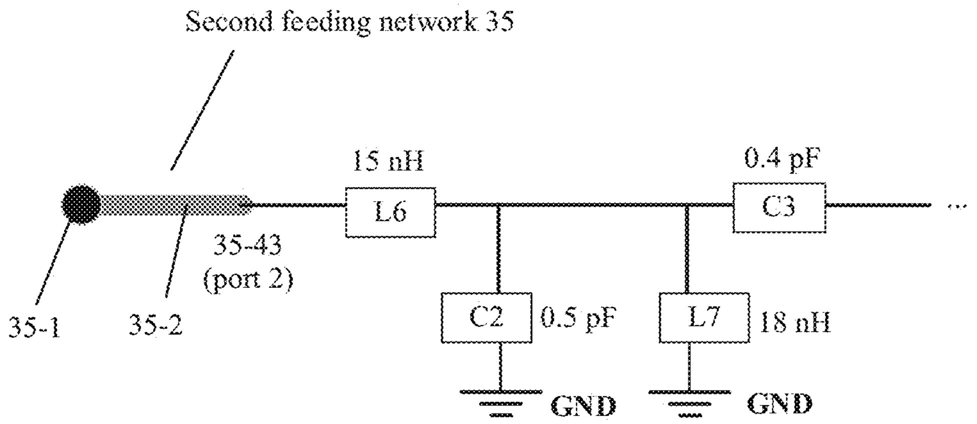

FIG. 9A to FIG. 9C show a simulated S-parameter, an efficiency curve, and an envelope correlation coefficient of the antenna structure according to Embodiment 2. Herein, FIG. 9A represents the simulated S-parameter. FIG. 9B represents the efficiency curve, and FIG. 9C represents the envelope correlation coefficient. In an optional implementation, a matching network designed at the first feeding port 33-4 (port 1) may be first, at the port 1, connected in series to a 3 nH inductor (L5) and then connected in parallel to a 3.3 pF capacitor (C1), to generate a 2.4 GHz Wi-Fi operating frequency, as shown in FIG. 10A. In an optional implementation, a matching network designed at the second feeding port 35-3 (port 2) may be first, at the port 2, connected in series to a 15 nH inductor (L6), then connected in parallel to a 0.5 pF capacitor (C2), then connected in parallel to an 18 nH inductor (L7), and finally connected in series to a 0.4 pF capacitor (C3), to generate two frequencies: an operating frequency of GPS L1 operating frequency of 2.4 GHz Wi-Fi, as shown in FIG. 10B. All the inductors and the capacitors mentioned herein may be lumped elements, and may be ideal devices.

As shown in FIG. 9A, for the half-wavelength slot mode excited by the first feeding port 33-4 (port 1), in a 2.4 GHz Wi-Fi operating frequency range, a reflection coefficient is less than −6.3 dB, in other words, the antenna structure can generate a 2.4 GHz Wi-Fi resonance in the half-wavelength slot mode. As shown in FIG. 9A, for the in-phase current loop mode excited by the second feeding port 35-3 (port 2), a GPS L1 resonance and a 2.4 GHz Wi-Fi resonance may be generated. A reflection coefficient of the 2.4 GHz Wi-Fi resonance is close to (less than −6.3 dB) a reflection coefficient of the 2.4 GHz Wi-Fi resonance in the half-wavelength slot mode. A transmit coefficient of the resonance at the operating frequency of the GPS L1 is less than −5.8 dB. As shown in FIG. 9B, for the half-wavelength slot mode excited by the first feeding port 33-4 (port 1), in a 2.4 GHz Wi-Fi operating frequency range, a total efficiency is between −2.2 and −1.9. It can be learned that, the radiation efficiency of the resonance generated by the antenna apparatus in the half-wavelength slot mode in the 2.4 GHz Wi-Fi operating frequency range is relatively high, and there is no obvious efficiency dent. As shown in FIG. 9B, for the in-phase current loop mode excited by the second feeding port 35-3 (port 2), a GPS L1 resonance and a 2.4 GHz Wi-Fi resonance may be generated. A total efficiency of the 2.4 GHz Wi-Fi resonance is almost the same as (between −2.2 to −1.9) a total efficiency of the 2.4 GHz Wi-Fi resonance in the half-wavelength slot mode. A total efficiency of the resonance at the operating frequency of the GPS L1 is −4.9. It can be learned that in the in-phase current loop mode, the radiation efficiencies of the two resonances generated by the antenna apparatus in the 2.4 GHz Wi-Fi operating frequency range and the GPS L1 operating frequency are relatively high, and there is no obvious efficiency dent. Because polarization directions of the antenna in the two modes are orthogonal, high isolation and a small envelope correlation coefficient are also obtained in the 2.4 GHz Wi-Fi operating frequency range. As shown in FIG. 9C, in a required operating frequency range of 3.4 GHz to 3.6 GHz, an envelope correlation coefficient is less than 0.0065, and isolation is better than −21.6 dB.

The antenna structure according to Embodiment 2 may implement an antenna of a GPS L1+2.4 GHz Wi-Fi MIMO specification, and has high isolation. This is not limited thereto. The antenna structure may alternatively operate in another frequency band, for example, a GPS L5 (whose operating frequency is 1.176 GHz) +2.4 GHz Wi-Fi MIMO operating frequency range, and may be specifically set by adjusting a size of the slot 23 in the antenna structure.

Embodiment 3

Figure 11A:
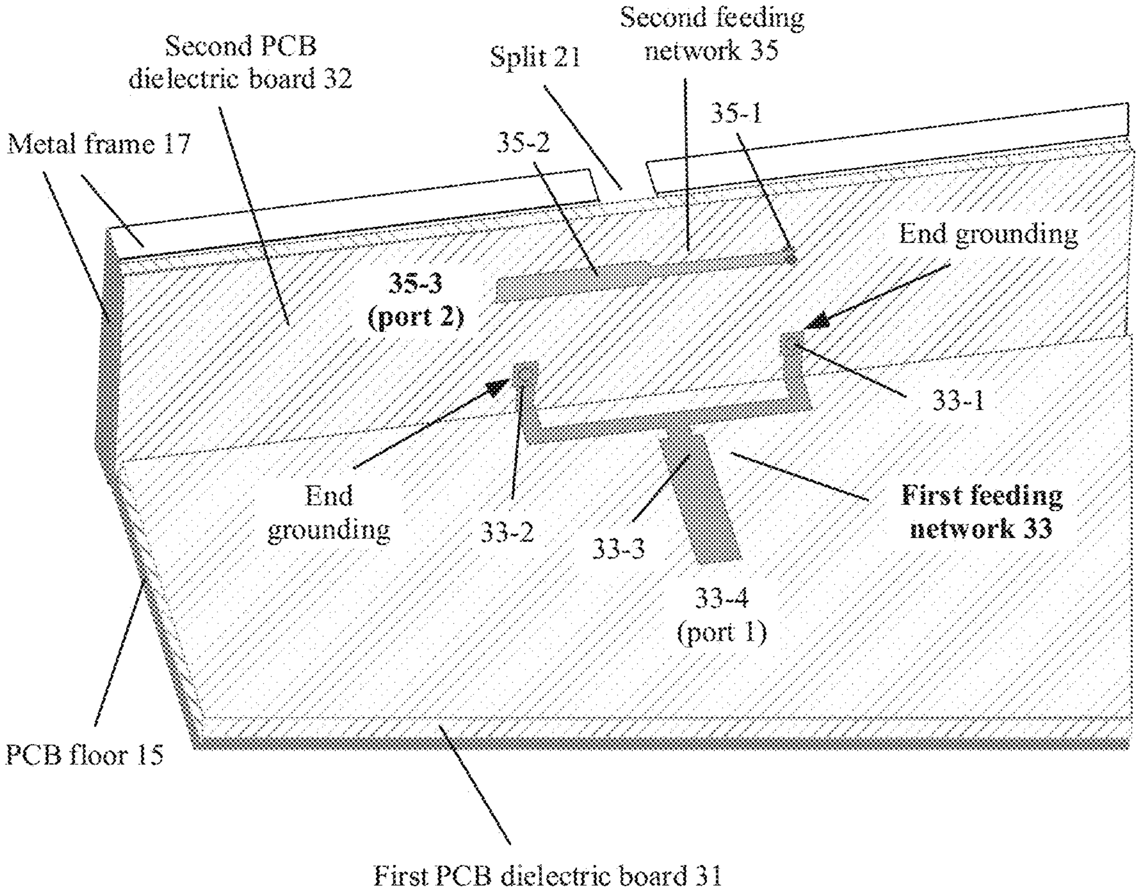
FIG. 11A and FIG. 11B are schematic diagrams of an antenna design solution according to still another embodiment of this application.
Figure 11B:
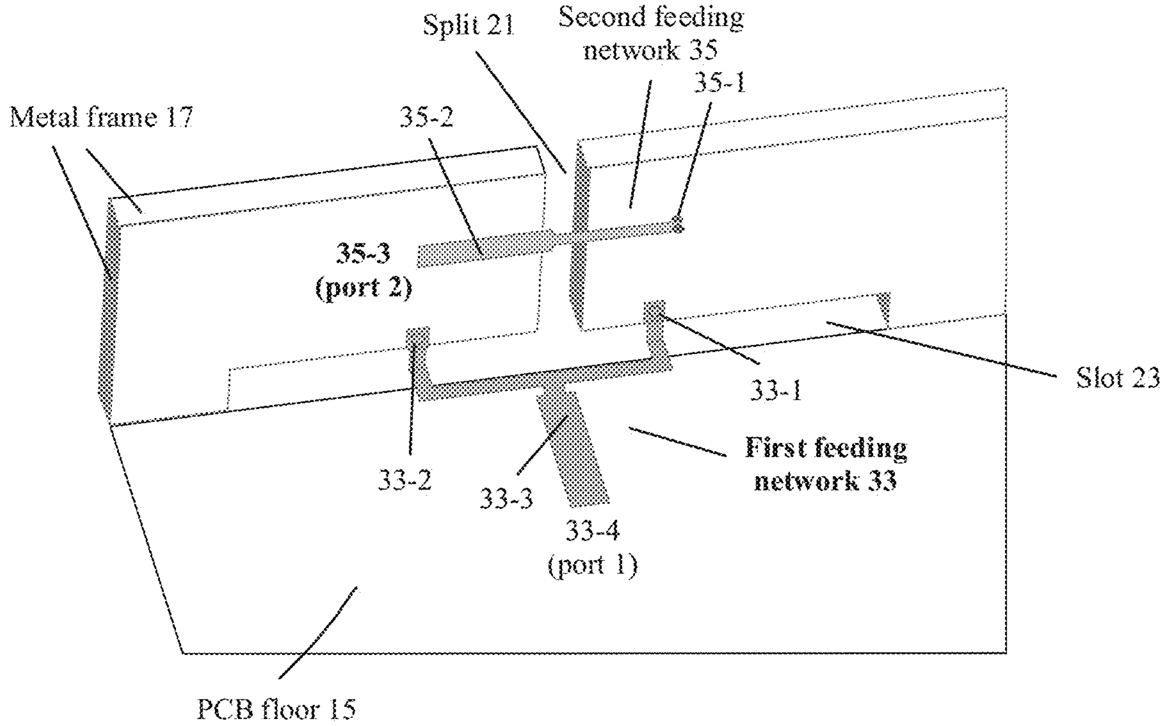

FIG. 11A and FIG. 11B show an example of an antenna structure according to Embodiment 3. FIG. 11A is a schematic diagram of an antenna model including a PCB dielectric board, and FIG. 11B is a schematic diagram of an antenna structure after the PCB dielectric board is hidden. A PCB floor 15 may be disposed at the bottom of a first PCB dielectric board 31 (the PCB 13 in FIG. 1). Alternatively, a second PCB dielectric board 32 may be disposed close to a metal frame 13. As shown in FIG. 11A and FIG. 11B, the antenna structure may include a split 21 provided on the metal frame 17 and a slot 23 communicating with the split 21. The slot 23 may be connected to the split 21 at a middle position on one side of the slot 23. Embodiment 3 is different from Embodiment 1 in that the slot 23 in Embodiment 3 is provided on the metal frame 17. In this way, the antenna structure may radiate a signal outward by using the slot 23 on the metal frame 17, and no clearance needs to be reserved on the first PCB dielectric board 31 for the antenna structure, thereby implementing a zero-clearance antenna structure.

A first feeding network 33 may be connected to two sides of the split 21. The first feeding network 33 may be specifically printed on the first PCB dielectric board 31 and the second PCB dielectric board 32. The first feeding network 33 may be used to excite the antenna structure to operate in the half-wavelength slot mode, to be specific, excite the antenna structure to generate a half wavelength in-phase electric field distributed over the slot 23. In this case, the slot 23 is used as a primary radiator to generate radiation.

Specifically, the first feeding network 33 may include feeding points that are disposed on two sides of the split 21 on the metal frame 17: a first feeding point 33-1 and a second feeding point 33-2. The first feeding point 33-1 is disposed on one side of the split 21, and the second feeding point 33-2 is disposed on the other side of the split 21. The first feeding network 33 may further include a first feeding line 33-3 and a first feeding port 33-4 (port 1). The first feeding line 33-3 may be a microstrip or another wire. The first feeding line 33-3 may be used to connect the first feeding port 33-4 and the feeding points on the two sides of the split 21. Specifically, an end of the first feeding line 33-3 may pass through the second PCB dielectric board 32 (in a manner of drilling a hole) and be connected to the feeding points on the two sides of the split 21. The first feeding line 33-3 may use a symmetric feeding line structure, for example, a T-shaped feeding line structure shown in FIG. 11A and FIG. 11B. In this way, electric potentials of the first feeding point 33-1 and the second feeding point 33-2 can be equal, so that the two sides of the split 21 are equipotential. Therefore, the split 21 may not affect a resonance generated by the slot 23 as a slot antenna (whose two ends are closed). Alternatively, the first feeding line 33-3 may cross the slot 23, to excite the slot 23 to generate a half wavelength in-phase electric field distributed over the slot 23. In this case, the slot 23 may be used as a primary radiator of the antenna structure to generate radiation. A matching network may be designed at the first feeding port 33-4 (port 1), and the matching network may be used to adjust (by adjusting an antenna transmit coefficient, impedance, or the like) a frequency band range covered by the slot 23.

A second feeding network 35 may be connected to one side of the split 21. The second feeding network 35 may be specifically printed on the second PCB dielectric board 32. The second feeding network 35 may be used to excite the antenna structure to operate in the open slot mode (or referred to as an in-phase current loop mode), to be specific, to excite the antenna structure to generate an in-phase current loop around the slot 23.

Specifically, the second feeding network 35 may include a third feeding point 35-1 disposed on one side of the split 21 on the metal frame, a second feeding line 35-2, and a second feeding port 35-3 (port 2). The second feeding line 35-2 may be a microstrip or another wire. The second feeding line 35-2 may be used to connect the second feeding port 35-3 and the third feeding point 35-1. Specifically, an end of the second feeding line 35-2 may pass through the second PCB dielectric board 32 (in a manner of drilling a hole) and be connected to the third feeding point 35-1. The second feeding line 35-2 may cross the split 21, to excite the split 21 to generate an electric field distributed over the split 21, finally form an in-phase current loop around the slot 23, and effectively excite the PCB floor 15. In this case, the PCB floor 15 may be used as a primary radiator of the antenna structure to generate radiation. A matching network may be designed at the second feeding port 35-3 (port 2), and the matching network may be used to adjust (by adjusting an antenna transmit coefficient, impedance, or the like) a frequency band range covered by the PCB floor 15.

It can be learned from the foregoing content that a polarization direction of the antenna structure when the antenna structure operates in the half-wavelength slot mode is orthogonal to a polarization direction when the antenna structure operates in the open slot mode (or referred to as an in-phase current loop mode), thereby having good isolation.

The antenna structure according to Embodiment 3 may be a zero-clearance Sub-6G dual-antenna pair applicable to a terminal with an all-metal ID, and an operating frequency of the dual-antenna pair ranges from 3.4 GHz to 3.6 GHz. In an optional implementation, an overall size of the terminal may be 150 mm×75 mm×7 mm, the first PCB dielectric, board 31 may be an FR-4 dielectric board with a thickness of 0.8 mm, a size of the slot 23 may be 25 mm××1.5 mm, a size of the split 21 may be 5.5 mm×1.5 mm, and the second PCB dielectric board 32 close to the metal frame 17 may be an FR-4 dielectric board with a thickness of 0.254 mm.

Figure 12A:
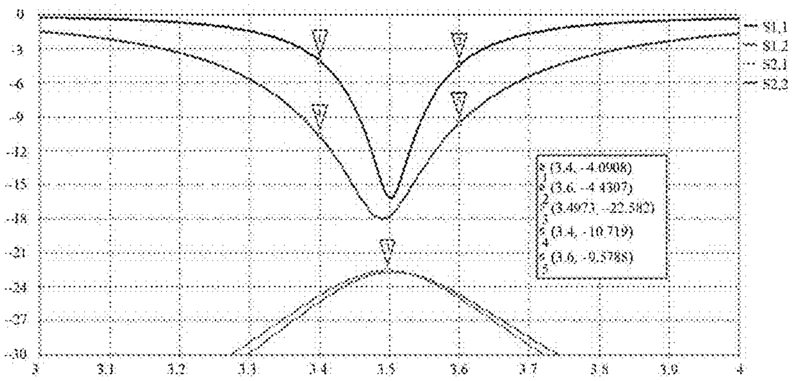
FIG. 12A to FIG. 12C show some schematic simulation diagrams of the antenna design solution shown in FIG. 11A and FIG. 11B.
Figure 12B:
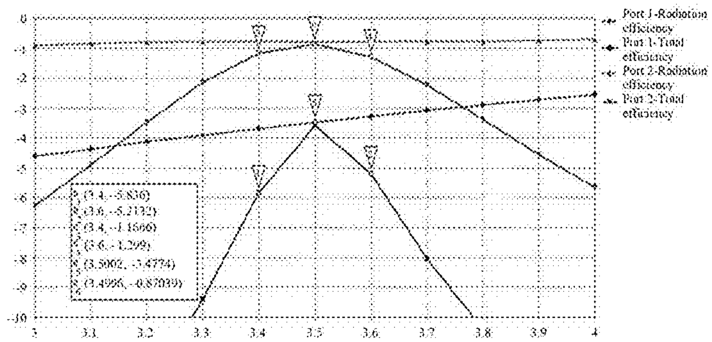
Figure 12C:
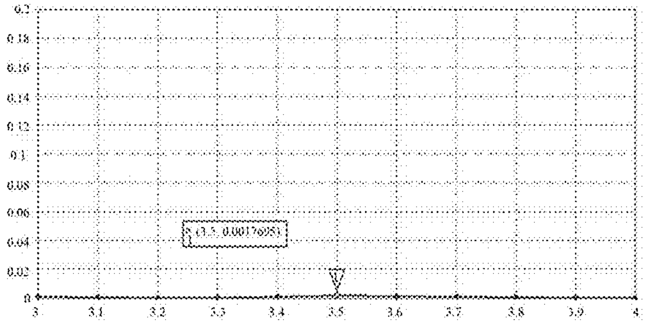
Figure 13A:
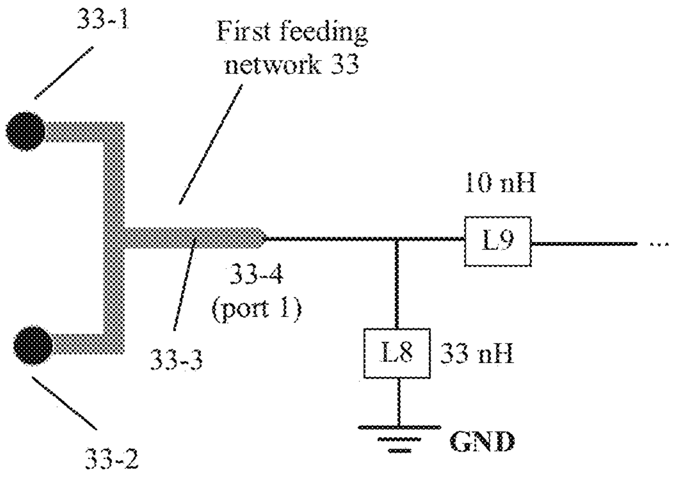
FIG. 13A and FIG. 13B are schematic diagrams of a matching network at a feeding port in the antenna design solution shown in FIG. 11E and FIG. 11B.
Figure 13B:
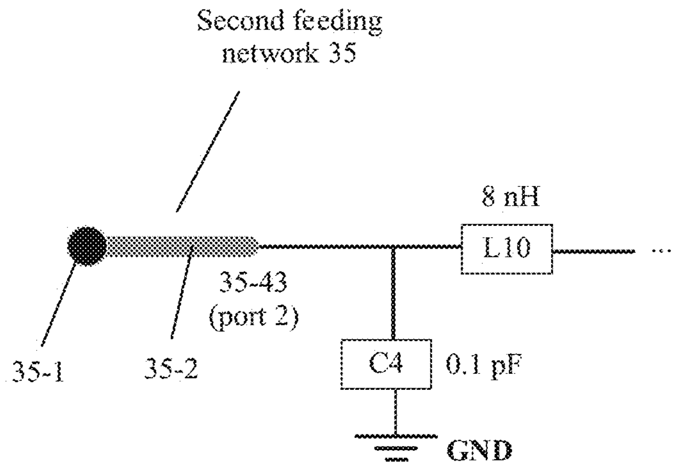

FIG. 12A to FIG. 12C show a simulated S-parameter, an efficiency curve, and an envelope correlation coefficient of the Sub-6G dual-antenna pair according to Embodiment 3. Herein, FIG. 12A represents the simulated S-parameter, FIG. 12B represents the efficiency curve, and FIG. 12C represents the envelope correlation coefficient. In an optional implementation, the matching network designed at the first feeding port 33-4 (port 1) may be first, at the port 1, connected in parallel to a 33 nH inductor (L8) and then connected in series to a 10 nH inductor (L9), as shown in FIG. 13A. In an optional implementation, the matching network designed at the second feeding port 35-3 (port 2) may be first, at the port 2, connected in parallel to a 0.1 pF capacitor (C4) and then connected in series to an 8 nH inductor (L10), as shown in FIG. 13B. All the inductors mentioned herein may be lumped inductors, and may be ideal devices.

As shown in FIG. 12A, in a required operating frequency range of 3.4 GHz to 3.6 GHz, for the half wavelength slot mode excited by the first feeding port 33-4 (port 1), a reflection coefficient is less than −4.1 dB. For the in-phase current loop mode excited by the second feeding port 35-3 (port 2), a reflection coefficient is less than −9.6 dB. It can be learned that the antenna apparatus can cover the frequency range of 3.4 GHz to 3.6 GHz in the two modes. As shown in FIG. 12B, for the half-wavelength slot mode excited by the first feeding port 33-4 (port 1), a total efficiency is between −5.8 and −3.5. For the in-phase current loop mode excited by the second feeding port 35-3 (port 2), a total efficiency is between −1.3 and −0.9. It can be learned that the radiation efficiencies of the antenna apparatus in the two modes are relatively high, and there is no obvious efficiency dent. Because the polarization directions of the antenna in the two modes are orthogonal, high isolation and a small envelope correlation coefficient are obtained. As shown in FIG. 12C, in a required operating frequency range of 3.4 GHz to 3.6 GHz, an envelope correlation coefficient is less than 0.0018, and isolation is better than −22.6 dB.

The antenna structure according to Embodiment 3 is applicable to a terminal with a metal frame. The antenna structure may also be applicable to a terminal with an all-metal ID, and may be implemented as a zero-clearance antenna structure for the terminal with an all-metal ID. The antenna structure shown in FIG. 11A and FIG. 11B for example may be alternatively implemented as a zero-clearance co-frequency high-isolation dual-antenna pair for a frequency band other than the Sub-6G frequency band, and may be specifically set by adjusting sizes of the split 21 and the slot 23 in the antenna structure. For example, the antenna structure may be alternatively implemented as a zero-clearance co-frequency dual Wi-Fi antenna pair for a frequency band of 2.4 GHz. For another example, when the size of the slot 23 is the same as the size of the slot 23 in Embodiment 2, the antenna structure shown in FIG. 11A and FIG. 11B for example may be alternatively implemented as a zero-clearance antenna of a GPS L1+2.4 GHz Wi-Fi MIMO specification. For still another example, the antenna structure shown in FIG. 11A and FIG. 11B for example may be alternatively implemented as a zero-clearance antenna of a GPS L5+2.4 GHz Wi-Fi MIMO specification. Unlimited to these examples, the antenna structure according to Embodiment 3 may be alternatively implemented as a zero-clearance multi-antenna structure of another specification.

The following describes extended implementations related to the foregoing embodiments.

1. The length of the slot 23 is adjusted with reference to a matching technique.

Figure 14A:
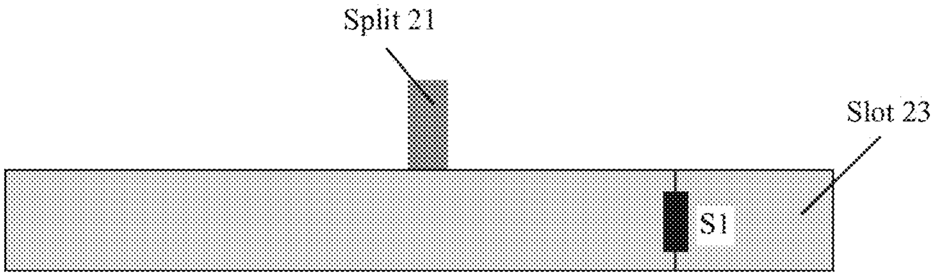
FIG. 14A to FIG. 14C are schematic structural diagrams of an antenna apparatus according to still other embodiments of this application.

In some embodiments, the length of the slot 23 may be adjusted with reference to a matching technology or a switch, so that the antenna structure can cover more frequency bands. For example, as shown in FIG. 14A, two sides of the slot 23 may be connected by using a tuning switch S1. When the tuning switch S1 is in a closed state, the length of the slot 23 decreases. In this case, the antenna structure may generate another resonance, and the another resonance may be different from a resonance generated by the antenna structure when the tuning switch S1 is turned off. In this way, the antenna structure shown in FIG. 14A for example can generate more resonances and cover more frequency bands. This is not limited to the example in FIG. 14A. In actual application, the length of the slot 23 may be adjusted with reference to another matching technology or switch. This is not limited in this application. FIG. 14A shows such an antenna structure as a simplified example, and does not reflect the metal frame 17, the PCB floor 15, and the like designed for the antenna structure.

The slot 23 may not have to be connected to the split 21 at the middle position on one side of the slot 23.

Figure 14B:
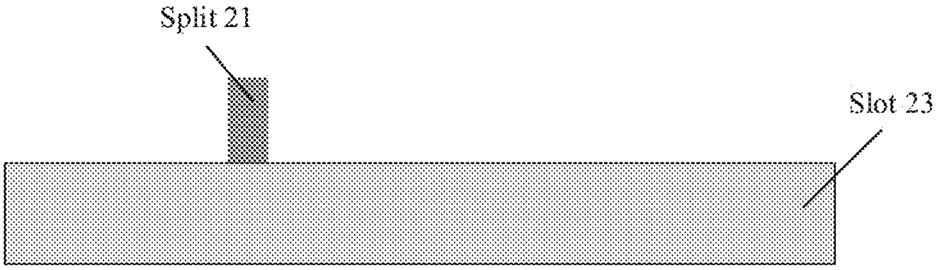

In some embodiments, as shown in FIG. 14B for example, the split 21 may be connected to the slot 23 at a non-middle position on one side of the slot 23. In this antenna structure, multiple antennas may be implemented at the split 21, but isolation is not as high as those of the antenna structures described in Embodiment 1 to Embodiment 3. FIG. 14B shows such an antenna structure as a simplified example, and does not reflect the metal frame 17, the PCB floor 15, and the like designed for the antenna structure.

3. The first feeding network 33 may alternatively use an asymmetric network structure.

Figure 14C:
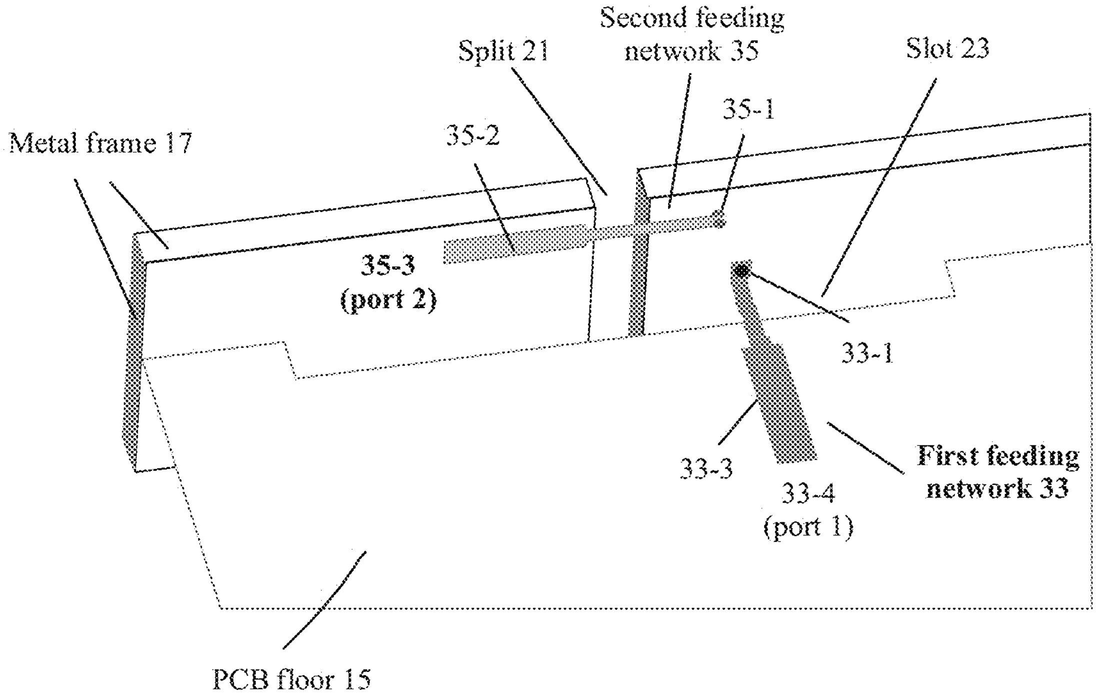

In some embodiments, as shown in FIG. 14C for example, the first feeding network 33 may use an asymmetric network structure. For example, the feeding point 33-1 is disposed only on one side of the split 21, and the feeding line 33-3 crosses the slot 23. The first feeding network 33 may also excite the antenna structure to operate in the half-wavelength slot mode, to be specific, excite the slot 23 to act as a primary radiator to generate radiation. In this case, the antenna structure may also implement multiple antennas at the split 21, but isolation is not as high as those of the antenna structures described in Embodiment 1 to Embodiment 3.

It can be learned that, the antenna structures according to the embodiments of this application may form a combo antenna structure by using the split 21 on the metal frame of the terminal and the slot 23 communicating with the split 21. A multi-antenna structure may be implemented at the split 21. The antenna structures are applicable to a terminal with a metal frame or a terminal with an all-metal ID. In addition, the antenna has a simple structure and becomes easy to expand due to a modular design.

In this application, a wavelength in a wavelength mode (for example, a half wavelength mode) of an antenna may be a wavelength of a signal radiated by the antenna. For example, a half wavelength mode of a floating metal antenna may generate a resonance for a 2.4 GHz frequency band. A wavelength in the half wavelength mode is a wavelength of a signal radiated by the antenna in the 2.4 GHz frequency band. It should be understood that a wavelength of the radiated signal in the air may be calculated as follows: Wavelength=Speed of light/Frequency, where the frequency is a frequency of the radiated signal. A wavelength of the radiated signal in a medium may be calculated as follows: Wavelength=(Speed of light/$\sqrt{\varepsilon}$)/Frequency, where $\sqrt{\varepsilon}$ is a relative permittivity of the medium, and the frequency is a frequency of the radiated signal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna structure, comprising:

a rear cover;

a printed circuit board (PCB) configured to support an electronic component;

a PCB floor disposed between the PCB and the rear cover;

a metal frame disposed at edges of the PCB floor and configured to ground the electronic component;

a split antenna formed by a split provided on the metal frame;

a slot antenna formed by a slot connecting the split, wherein the slot is connected to the split on a first side of the slot, and wherein a second side of the slot contacts the PCB floor;

a first feeding network connected to two sides of the split and configured to excite the antenna structure to generate a first radiation mode, wherein a first primary radiator of the first radiation mode is the slot, and wherein a half wavelength in-phase electric field is distributed over the slot;

a second feeding network connected to one side of the split and configured to excite the antenna structure to generate a second radiation mode, wherein a second primary radiator of the second radiation mode is the PCB floor, wherein an in-phase current loop is distributed around the slot, and wherein a first polarization direction of the first radiation mode is orthogonal to a second polarization direction of the second radiation mode.

2. The antenna structure of claim 1, wherein the slot is connected to the split at a middle position on one side of the slot.

3. The antenna structure of claim 1, wherein the slot antenna is formed by a second slot on the metal frame or a third slot on the PCB floor.

4. The antenna structure of claim 1, wherein the first feeding network comprises:

a first feeding point disposed on one side of the split;

a second feeding point disposed on the other side of the split;

a first feeding port; and a first feeding line crossing the split and configured to connect the first feeding port, the first feeding point, and the second feeding point.

5. The antenna structure of claim 4, wherein the first feeding line has a symmetric feeding line structure configured to equalize electric potentials of the two sides of the split.

6. The antenna structure of claim 4, further comprising a matching network disposed at the first feeding port and configured to adjust a frequency band range covered by the slot antenna.

7. The antenna structure of claim 1, wherein the second feeding network comprises:

a third feeding point disposed on one side of the split;

a second feeding port; and a second feeding line crossing the split and configured to connect the second feeding port and the third feeding point.

8. The antenna structure of claim 7, further comprising a matching network disposed at the second feeding port and configured to adjust a frequency band range covered by the PCB floor.

9. The antenna structure of claim 1, wherein the antenna structure is configured to:

generate a first resonance when the antenna structure operates in the first radiation mode and excites the slot antenna; and generate a second resonance when the antenna structure operates in the second radiation mode and excites the PCB floor, wherein the first resonance and the second resonance are in a same frequency band.

10. The antenna structure of claim 9, wherein the same frequency band comprises a sub-sixth generation (sub-6G) frequency band, a WI-FI frequency band, or a Global Positioning System (GPS) frequency band.

11. The antenna structure of claim 1, wherein the antenna structure is configured to excite the slot antenna to generate a first resonance for a first frequency band when operating in the first radiation mode, and wherein the antenna structure is configured to excite the PCB floor to generate a second resonance for a second frequency band when operating in the second radiation mode.

12. The antenna structure of claim 11, wherein the first frequency band comprises a first WI-FI frequency band, and wherein the second frequency band comprises a second WI-FI frequency band and a Global Positioning System (GPS) frequency band.

13. The antenna structure of claim 1, wherein the rear cover is a metal rear cover.

14. An electronic device, comprising:
a printed circuit board (PCB) configured to support an electronic component;
a rear cover;
a PCB floor disposed between the PCB and the rear cover and configured to ground the electronic component;
a metal frame disposed at edges of the PCB floor; and
an antenna apparatus comprising:
a split antenna formed by a split provided on the metal frame;
a slot antenna formed by a slot connecting the split, wherein the slot is connected to the split on a first side of the slot, and wherein a second side of the slot touches the PCB floor;
a first feeding network connected to two sides of the split and configured to excite the antenna apparatus to generate a first radiation mode, wherein a first primary radiator of the first radiation mode is the slot, and wherein a half wavelength in-phase electric field is distributed over the slot; and
a second feeding network connected to one side of the split and configured to excite the antenna apparatus to generate a second radiation mode,
wherein a second primary radiator of the second radiation mode is the PCB floor,
wherein an in-phase current loop is distributed around the slot, and
wherein a first polarization direction of the first radiation mode is orthogonal to a second polarization direction of the second radiation mode.

15. The electronic device of claim 14, wherein the slot is connected to the split at a middle position on one side of the slot.

16. The electronic device of claim 14, wherein the slot antenna is formed by a second slot on the metal frame or a third slot on the PCB floor.

17. The electronic device of claim 14, wherein the first feeding network comprises:
a first feeding point disposed on one side of the split;
a second feeding point disposed on the other side of the split;
a first feeding port; and
a first feeding line crossing the split and configured to connect the first feeding port, the first feeding point, and the second feeding point.

18. The electronic device of claim 17, wherein the first feeding line has a symmetric feeding line structure configured to equalize electric potentials of the two sides of the split.

19. The electronic device of claim 14, wherein the second feeding network comprises:
a third feeding point disposed on one side of the split;
a second feeding port; and
a second feeding line crossing the split and configured to connect the second feeding port and the third feeding point.

20. The electronic device of claim 14, wherein the rear cover is a metal rear cover.

* * * * *